US010009396B2

(12) United States Patent
Guo et al.

(10) Patent No.: US 10,009,396 B2
(45) Date of Patent: Jun. 26, 2018

(54) QUEUE-BASED ADAPTIVE CHUNK SCHEDULING FOR PEER-TO-PEER LIVE STREAMING

(71) Applicant: THOMSON LICENSING, Issy de Moulineaux (FR)

(72) Inventors: Yang Guo, Princeton Junction, NJ (US); Chao Liang, Cupertino, CA (US); Yong Liu, Brooklyn, NY (US)

(73) Assignee: THOMSON LICENSING, Issy les Moulineaux (FR)

( * ) Notice: Subject to any disclaimer, the term of this patent is extended or adjusted under 35 U.S.C. 154(b) by 668 days.

(21) Appl. No.: 14/181,975

(22) Filed: Feb. 17, 2014

(65) Prior Publication Data

US 2014/0195612 A1    Jul. 10, 2014

Related U.S. Application Data

(63) Continuation of application No. 12/452,033, filed on Dec. 11, 2009, now abandoned.

(51) Int. Cl.
*G06F 15/16* (2006.01)
*H04L 29/06* (2006.01)
*H04L 29/08* (2006.01)

(52) U.S. Cl.
CPC ...... *H04L 65/4076* (2013.01); *H04L 65/4084* (2013.01); *H04L 65/608* (2013.01); *H04L 65/80* (2013.01); *H04L 67/1085* (2013.01)

(58) Field of Classification Search
CPC .... G06Q 10/10; H04L 29/06; H04L 29/08072
(Continued)

(56) References Cited

U.S. PATENT DOCUMENTS 5,991,302 A * 11/1999 Berl ................. H04L 47/10
                                                            370/389
6,094,435 A    7/2000 Hoffman et al.
(Continued)

FOREIGN PATENT DOCUMENTS

JP    2002507366    3/2002
JP    2004260278    9/2004
JP    2005149040    6/2005

OTHER PUBLICATIONS

Ying et al.: "pcVOD: Internet Peer-to-Peer Video-On-Demand with Storage Caching on Peers", Sep. 2005, 6 pages. Department of Computing Science, Univ. of Alberta, Alberta Canada.
(Continued)

*Primary Examiner* — Alan S Chou
(74) *Attorney, Agent, or Firm* — Tutunjian & Bitetto, P.C.

(57) ABSTRACT

A method and apparatus are described for scheduling content delivery in a peer-to-peer network, including receiving a message from a peer, classifying the received message, storing the classified message in one of a plurality of queues based on the classification, generating responses to messages based on a priority of the queue in which the classified message is stored and transmitting content to all peers in the peer-to-peer network. Also described are a method and apparatus for scheduling content delivery in a peer-to-peer network, including receiving one of a message and content from one of a content source server and a peer, classifying the received message, storing the classified message in one of a plurality of queues based on the classification, storing the received content, generating responses to messages based on a priority of the queue in which the classified message is stored and transmitting content to all other peers in the peer-to-peer network.

29 Claims, 9 Drawing Sheets

(58) Field of Classification Search
USPC .......................................................... 709/204
See application file for complete search history.

(56) References Cited

U.S. PATENT DOCUMENTS

| | | | |
|---|---|---|---|
| 7,174,385 B2 | 2/2007 | Li | |
| 2003/0028623 A1 | 2/2003 | Hennessey et al. | |
| 2003/0122966 A1 | 7/2003 | Markman et al. | |
| 2003/0204602 A1 | 10/2003 | Hudson et al. | |
| 2003/0236861 A1 | 12/2003 | Johnson et al. | |
| 2004/0143672 A1 | 7/2004 | Padmanabham et al. | |
| 2006/0080454 A1* | 4/2006 | Li .................. | H04L 65/4084 709/231 |
| 2006/0242155 A1 | 10/2006 | Moore et al. | |
| 2008/0098123 A1 | 4/2008 | Huang et al. | |
| 2008/0140853 A1* | 6/2008 | Harrison .......... | H04L 47/10 709/231 |
| 2008/0259942 A1* | 10/2008 | Skog ............... | H04L 61/106 370/401 |

OTHER PUBLICATIONS

KK To et al.: Decentralized Periodic Broadcasting for Large-scale video streaming, 4 pages, 2005.

Yim et al.: Decentralized Media Streaming Infrastructure (DEMSI): An Adaptive and High-Performance Peer-to-Peer Content Delivery Network. pp. 1-35, 2006.

Strufe: ilmStream: Efficient multimedia streaming in decentralised distributed systems. 6 pages, 2004.

Jiannong Cao et al., A Peer-to-Peer Approach to Task Scheduling in Computation Grid, 2nd International Workshop on Grid and Cooperative Computing (GCC 2003), Beijing, China Grid and Cooperative Computing, 2004, pp. 316-323, v. 3032.

Arjav Chakravarti, et al., Application-Specific Scheduling for the Organic Grid, 2004 IEEE International Conference on Cluster Computing (IEEE Cat. No. 04EX935), Feb. 22, 2005, p. 483.

Arjav J. Chakravarti, et al., Self-Organizing Scheduling on the Organic Grid, The International Journal of High Performance Computing Applications, Feb. 1, 2006, pp. 115-130, vol. 20 issue: 1.

K. K. To, et al, Decentralized Periodic Broadcasting for Large-Scale Video Streaming, 2005 IEEE International Conference on Multimedia and Expo, Oct. 24, 2005.

Rakesh Kumar, et al., Stochastic Fluid Theory for P2P Streaming Systems, IEEE Infocom 2007—26th IEEE International Conference on Computer Communications, May 29, 2007, pp. 919-928.

Richard T.B. Ma, et al., Incentive P2P Networks: A Protocol to Encourage Information Sharing and Contribution, ACM Sigmetrics Performance Evaluation Review—Special issue on the fifth workshop on MAthematical performance Modeling and Analysis (MAMA 2003), Sep. 2003, pp. 23-25, vol. 31 Issue 2.

Tatsuaki Osafune, et al., Analysis of an Epidemic Dissemination Protocol for Ad Hoc Networks, IEEE 2005 International Conference on Wireless Networks, Communications and Mobile Computing, Dec. 5, 2005, pp. 790-795.

Norihiro Umeda, et al., Peer-to-Peer Scheduling System with Scalable Information Sharing Protocol, IEEE Proceedings of the 2007 International Symposiumon Applications and the Internet Workshops (SAINTW'07), Feb. 12, 2007.

Lijuan Xiao, et al., GridIS: an Incentive-based Grid Scheduling, Proceedings of the 19th IEEE International Parallel and Distributed Processing Symposium (IPDPS'05), Apr. 18, 2005. pp. 1-10.

Zhikun Zhao, et al., An Agent-Based Adaptive Task-Scheduling Model for Peer-to-Peer Computational Grids, PRIMA 2006: Agent Computing and Multi-Agent Systems, 2006, pp. 721-727.

* cited by examiner

- - - ▶ Pull signal from peer to server
▮ Chunks in response to pull signal
▏ Chunks will no pull signal

QUEUE-BASED ADAPTIVE CHUNK SCHEDULING FOR PEER-TO-PEER LIVE STREAMING

This application is a continuation of co-pending U.S. application Ser. No. 12/452,033 filed Dec. 11, 2009 herein incorporated by reference and claims the benefit, under 35 U.S.C. § 365 of International Application PCT/US2007/015246 filed Jun. 28, 2007 which was published in accordance with PCT Article 21(2) on Dec. 31, 2008 in English.

FIELD OF THE INVENTION

The present invention relates to scheduling the delivery of content in a peer-to-peer network and, in particular, to a queue-based scheduling method and apparatus that maximizes the live streaming rate in a peer-to-peer network.

BACKGROUND OF THE INVENTION

Previous work has shown that the maximum video streaming rate in a peer-to-peer (P2P) live streaming system is determined by the video source server's capacity, the number of the peers in the system, and the aggregate uploading capacity of all peers.

In a prior art centralized scheduling method, a coordinator manages the system. The coordinator gathers information regarding the peers' upload capacity and source's upload capacity. The coordinator then computes the transmission rate from the source to each individual peer based on the centralized scheduling method.

The capability to achieve a high streaming rate is desirable for P2P live streaming. A higher streaming rate allows the system to broadcast with better quality. A higher streaming rate also provides more cushion to absorb bandwidth variations caused by peer churn and network congestion when constant bit rate (CBR) video is broadcast. The key to achieve a high streaming rate is to better utilize resources.

It would be advantageous to have a method and apparatus for scheduling content delivery in a P2P network which included a priority scheme to deal with new peers joining the P2P network, recovery of missing content and requests for additional content.

SUMMARY OF THE INVENTION

The present invention is directed to a queue-based scheduling method for a P2P live streaming system of content. As used herein content can be video, audio or any other multimedia type data/information. As used herein, a "/" denotes alternative names for the same or like components. The queue-based scheduling method of the present invention achieves the maximum streaming rate without using a centralized coordinator Ideally, in a P2P system/network, peers only exchange information with other peers and make decisions locally. Thus, ideally, no central coordinator is required and no global information is collected. Furthermore, the actual available upload capacity varies over time. This requires the central coordinator to continuously monitor each peer's upload capacity and continuously re-compute the substream rate to individual peers. Hence, a decentralized scheduling method is desirable. The difficulty is how to design a decentralized (local) scheduling method that is still able to achieve the global optimum, i.e., the maximum streaming rate of the system.

In the queue-based scheduling method of the present invention, each peer uploads the content obtained directly from the server to all other peers in the system. A peer is a node in a peer-to-peer system. To approach 100% uploading capacity utilization of all peers, different peers download different content from the server and the rate at which a peer downloads content from the content source server is proportional to its uploading capacity. A peer can be a node including a computer/processor, a laptop, a personal digital assistant, a mobile terminal or any playback device such as a set top box. A content source server is also alternatively called herein a source and a server and includes any apparatus or system that supplies content to peers in a peer-to-peer system/network.

The use of the term "upload" herein is used to indicate flow away from the acting node, where the acting node can be the server or one of the peers in the peer-to-peer network. Correspondingly, the use of the term "download" herein is used to indicate flow towards the acting node, where the acting node can be the server or one of the peers in the peer-to-peer network.

The present invention is directed to a decentralized scheduling method in which the peers as well as the source run a local scheduling method that makes decision based on information exchanged between the source and the peers. No central coordinator is required and no global information needs to be collected. The queue-based scheduling method of the present invention is able to achieve the theoretical upper bound of the streaming rate in a P2P live streaming system.

A method and apparatus are described for scheduling content delivery in a peer-to-peer network, including receiving a message from a peer, classifying the received message, storing the classified message in one of a plurality of queues based on the classification, generating responses to messages based on a priority of the queue in which the classified message is stored and transmitting content to all peers in the peer-to-peer network. Also described are a method and apparatus for scheduling content delivery in a peer-to-peer network, including receiving one of a message and content from one of a content source server and a peer, classifying the received message, storing the classified message in one of a plurality of queues based on the classification, storing the received content, generating responses to messages based on a priority of the queue in which the classified message is stored and transmitting content to all other peers in the peer-to-peer network.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1A:
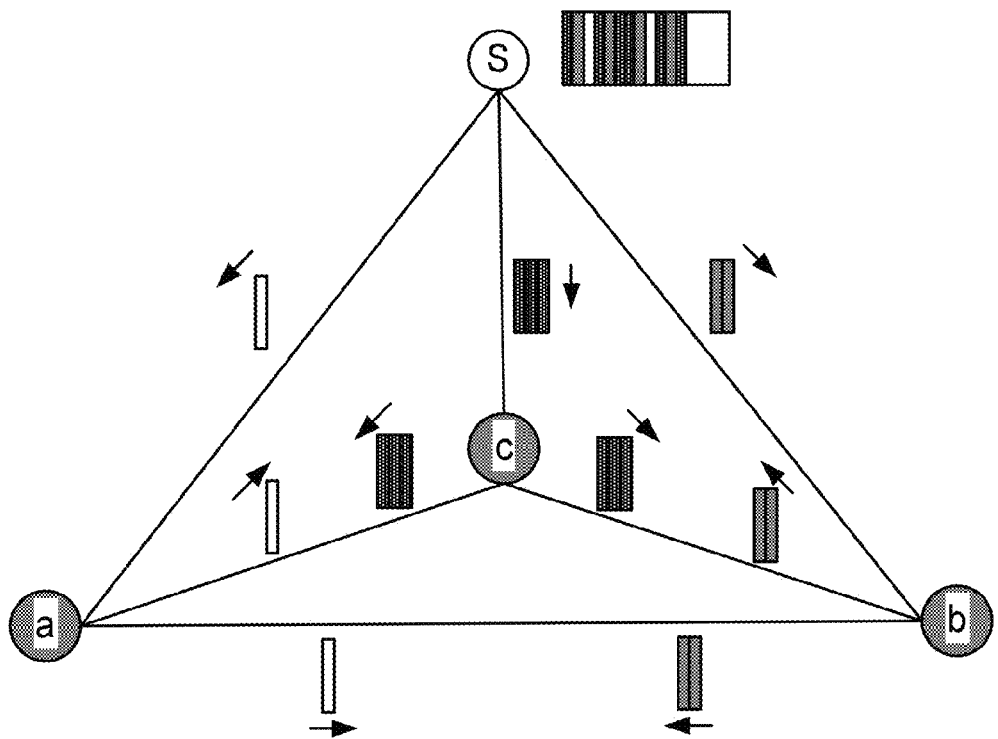
FIG. 1A is an illustrative example of how the different portions of data are scheduled among three heterogeneous nodes in the prior art centralized scheduling method.

It has been shown in the prior art that given a content source server and a set of peers with known upload capacities, the maximum streaming rate, $r^{max}$ is governed by the following formula:

$$r^{max} = \min\left\{u_s, \frac{u_s + \sum_{i=1}^{n} u_i}{n}\right\} \quad (1)$$

where $u_s$ is content source server's upload capacity, $u_i$ is peer i's upload capacity, and there are n peers in the system. The prior art proposed a centralized scheduling method that could achieve the above streaming rate maximum/upper bound. The prior art scheduling method employs a centralized approach with a coordinator managing the system. The coordinator gathers information regarding each peer's upload capacity and the content source's upload capacity. The coordinator then computes the transmission rate from the content source to individual peers based on the centralized scheduling method. Each peer relays some of the received streaming content to all other peers.

To put the present invention in context, how to calculate the streaming rate from the content source to the peers is discussed first. Then the queue-based scheduling method of the present invention is described. The queue-based scheduling method of the present invention does not require the central coordinator and is still able to achieve the maximum streaming rate.

The maximum streaming rate in a P2P system is governed by Equation (1). The second term on the right-hand side of equation, $$\left(u_s + \sum_{i=1}^{n} u_i\right)/n,$$

is the average upload capacity per peer. The centralized scheduling method behaves differently based on the relationship between the content source's upload capacity and the average upload capacity per peer.

Taking two exemplary cases/scenarios: in the first case, the content source server's upload capacity is smaller than the average of the peers' upload capacity and in the second case, the content source server's upload capacity is far greater than the average of the peers' upload capacity. In the first scenario, the content source server is resource poor and in the second scenario the content source server is resource rich.

Case 1:

$$u_s \leq \frac{u_s + \sum_{i=1}^{n} u_i}{n}$$

The maximum streaming rate is $r^{max} = u_s$. The content stream is divided into n sub-streams (one sub-stream for each peer), with the i-th sub-stream having a rate of $$s_i = \frac{u_i}{\sum_{i=1}^{n} u_i} u_s.$$

Note that the aggregate rate of the n sub-streams is equal to the maximum streaming rate, i.e., $$\sum_{i=1}^{n} u_i = u_s = r^{max}.$$

The coordinator requests the server to send the i-th sub-stream to the i-th peer. Furthermore, because $(n-1)s_i \leq u_i$, the i-th peer transmits this sub-stream to each of the other n−1 peers. Thus, each peer receives a sub-stream directly from the server and also receives n−1 additional sub-streams from the other n−1 peers. The total rate at which peer i receives the entire stream (all n sub-streams) is $$r_i = s_i + \sum_{k \neq i} s_k = u_s.$$

Hence the maximum rate $r^{max} = u_s$ can be supported.

Case 2:

$$u_s > \frac{u_s + \sum_{i=1}^{n} u_i}{n}$$

Here $$r^{max} = \frac{u_s + \sum_{i=1}^{n} u_i}{n}.$$

The content stream is divided into n+1 sub-streams with the i-th sub-stream, where i=1, 2, ..., n, having the rate $s_i = u_i/(n-1)$ and the (n+1)-st sub-stream having rate $$s_{n+1} = \left(u_s - \frac{\sum_{i=1}^{n} u_i}{n-1}\right)/n.$$

Clearly $s_i \geq 0$ for all i=1, 2, ..., n+1. Now the server sends two sub-streams to each peer i: the i-th sub-stream and the (n+1)-st substream. The server can do this because $$\sum_{i=1}^{n}(s_i + s_{n+1}) = u_s.$$

Furthermore, peer i streams a copy of the i-th sub-stream to each of the n-1 other peers. Each peer i can do this because $(n-1)s_i = u_i$. The total rate at which peer i receives the entire stream (all n sub-streams) is $$r_i = s_i + s_{n+1} + \sum_{k \neq i} s_k = \left(u_s + \sum_{i=1}^{n} u_i\right)/n.$$

Hence, the maximum rate $$r^{max} = \frac{u_s + \sum_{i=1}^{n} u_i}{n}$$

can be supported.

FIG. 1A is an illustrative example of how the different portions of data are scheduled among three heterogeneous nodes in the prior art centralized scheduling method. There are three peers in the system. The server has capacity of 6. The upload capacities of a, b and c are 2, 4 and 6 respectively. Suppose peers all have enough download capacity, the maximum content live streaming rate that can be supported in the system is 6. To achieve that rate, the server divides content chunks into groups of 6. Peer a is responsible for uploading 1 chunk out of each group to each of the other peers while b and c are responsible for uploading 2 and 3 chunks within each group to each of the other peers respectively. In this way, the aggregate download rate of all peers is the maximum rate of 6, which is the server's download capacity. To implement such a scheduling method, a central coordinator is required to collect the upload capacity information and execute the scheduling method. Furthermore, each peer needs to maintain a connection and exchange content with all other peers in the system. Additionally, the server needs to split the video stream into multiple sub-streams with different rates for each peer.

Next the queue-based scheduling method of the present invention is described. The maximum streaming rate can be achieved without using a centralized coordinator. The decentralized scheduling method of the present invention is a queue-based adaptive chunk scheduling method.

Ideally, in a P2P system, peers only exchange information with other peers and make decisions locally. Thus, ideally, no central coordinator is required and no global information is collected. Furthermore, the actual available upload capacity varies over time. This requires the central coordinator to continuously monitor each peer's upload capacity and continuously re-compute the sub-stream rate to individual peers. Hence, a decentralized scheduling method is desirable. The difficulty is how to design a decentralized (local) scheduling method that is still able to achieve the global optimum, i.e., the maximum streaming rate of the system. The queue-based decentralized scheduling method of the present invention satisfies the above objectives.

Figure 1B:
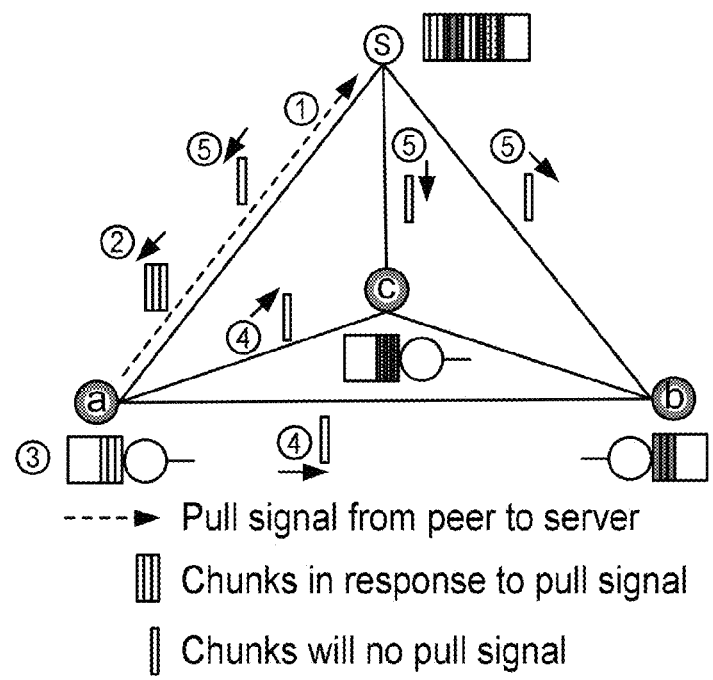
FIG. 1B depicts a peer-to-peer streaming system using queue-based chunk scheduling with one source server and three peers.

FIG. 1B depicts a peer-to-peer streaming system using queue-based chunk scheduling with one source server and three peers. Each peer maintains several queues including a forward queue. Using peer a as an example, the signal and data flow is described next. Steps/acts are indicated by a number with a circle around the number. 'Pull' signals are sent from peer a to the server whenever the peer a's queues become empty (have fallen below a threshold) (step 1). The server responds to the 'pull' signal by sending three data chunks back to peer a (step 2). These chunks will be stored in the forward queue of peer a (step 3) and be relayed/forwarded/transmitted to peer b and peer c (step 4). When the server has responded to all 'pull' signals on its 'pull' signal queue, the server forwards/transmits one duplicated data chunk to all peers (step 5). These data chunks will not be stored in the forward queue of the peers and will not be relayed further.

Figure 2:
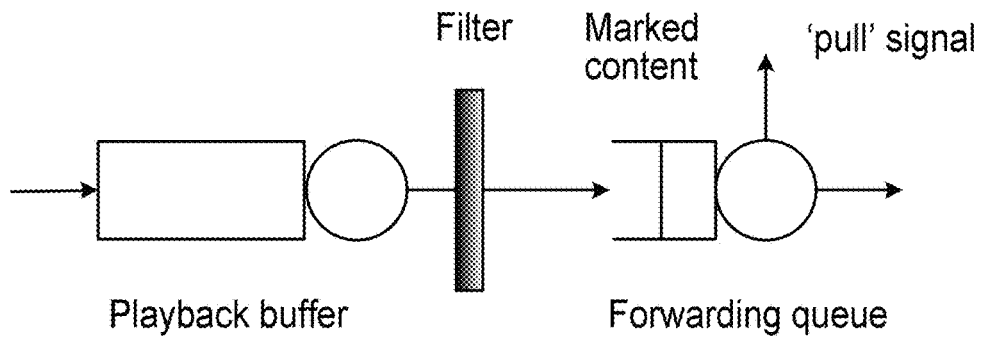
FIG. 2 depicts the queuing model for peers in the queue-based scheduling method in accordance with the principles of the present invention.

FIG. 2 depicts the queuing model for peers in the queue-based scheduling method of the present invention. A peer maintains a playback buffer that stores all received streaming content from the source server and other peers. The received content from different nodes is assembled in the playback buffer in playback order. The peer's media player renders/displays the content from this buffer. Meanwhile, the peer maintains a forwarding queue which is used to forward content to all other peers. The received content is partitioned into two classes: F marked content and NF marked content. F (forwarding) represents content that should be relayed/forwarded to other peers. NF (non-forwarding) indicates content that is intended for this peer only and no forwarding is required. The content forwarded by neighbor peers is always marked as NF. The content received from the source server can be marked either as F or as NF. NF content is filtered out. F content is stored into the forwarding queue and will be forwarded to other peers. In order to fully utilize a peer's upload capacity, the peer's forwarding queue should be kept non-empty. A signal is sent to the source server to request more content whenever the forwarding queue becomes empty. This is termed a 'pull' signal herein. The rules for marking the content at the content source server are described next.

Figure 3:
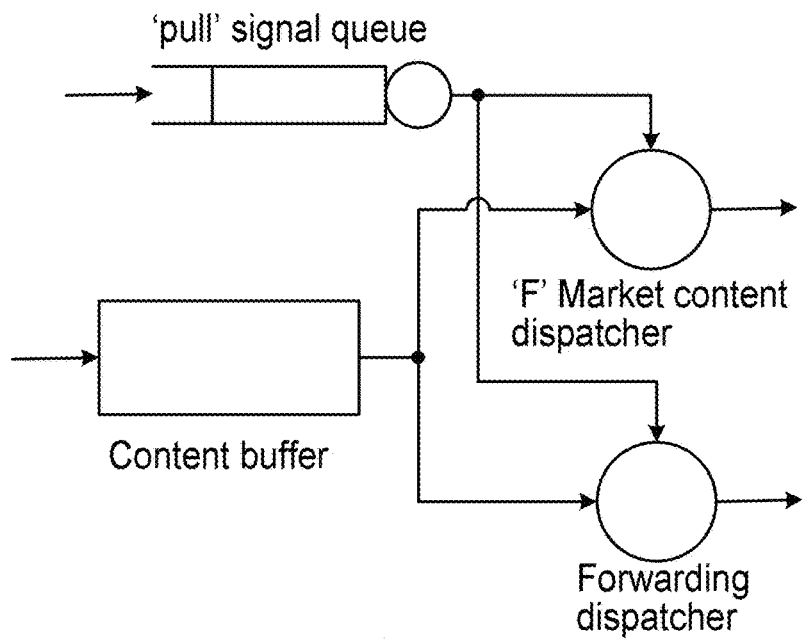
FIG. 3 illustrates the server-side queuing model of the queue-based scheduling method in accordance with the principles of the present invention.

FIG. 3 illustrates the server-side queuing model of the queue-based scheduling method of the present invention. The source server has two queues: a content queue and a signal queue. The content queue is a multi-server queue with two dispatchers: an F marked content dispatcher and a forwarding dispatcher. The dispatcher that is invoked depends on the control/status of the 'pull' signal queue. Specifically, if there is 'pull' signal in the signal queue, a small chunk of content is taken from the content buffer. This chunk of content is marked as F and dispatched by the F marked content dispatcher to the peer that issued the 'pull' signal. The 'pull' signal is then removed from the 'pull' signal queue. If the signal queue is empty, the server takes a small chunk of content from the content buffer and puts that chunk of content into the forwarding queue to be dispatched. The forwarding dispatcher marks the chunk as NF and sends it to all peers in the system.

Next, the optimality of the queue-based data chunk scheduling method of the present invention is shown. That is, the queue-based scheduling method for both the peer-side and the server-side achieves the maximum P2P live streaming rate of the system as indicated by Equation (1).

Theorem: Assume that the signal propagation delay between a peer and the server is negligible and the data content can be transmitted at an arbitrary small amount, then the queue-based decentralized scheduling algorithm as described above achieves the maximum streaming rate possible in the system.

Proof: Suppose the content is divided into small chunks. The content source server sends out one chunk each time it services a 'pull' signal. A peer issues a 'pull' signal to the server whenever the peer's forwarding queue becomes empty. $\delta$ denotes the chunk size.

For peer i, it takes $(n-1)\cdot\delta/u_i$ time to forward one data chunk to all peers. Let $r_i$ be the maximum rate at which the 'pull' signal is issued by peer i. Hence, $r_i = u_i/(n-1)\delta$.

The maximum aggregate rate of 'pull' signal received by the server, r, is $$r = \sum_{i=1}^{n} r_i = \frac{\sum_{i=1}^{n} u_i}{(n-1)\delta}.$$

It takes the server $\delta/u_s$ time to service a 'pull' signal. Hence, the maximum 'pull' signal rate the server can accommodate is $u_s/\delta$. Now consider the following two scenarios/cases:

Case 1:

$$u_s/\delta \leq \frac{\sum_{i=1}^{n} u_i}{(n-1)\delta}$$

In this scenario, the server cannot handle the maximum 'pull' signal rate. The signal queue at the server side is hence never empty and the entire server bandwidth is used to transmit F marked content to peers. In contrast, a peer's forwarding queue becomes idle while waiting for the new data content from the source server. Since each peer has sufficient upload bandwidth to relay the F marked content (received from the server) to all other peers, the peers receive content sent out by the server at the maximum rate.

The supportable streaming rate is equal to the server's upload capacity. The condition $$u_s/\delta \leq \frac{\sum_{i=1}^{n} u_i}{(n-1)\delta}$$

is equivalent to $$u_s \leq \frac{u_s + \sum_{i=1}^{n} u_i}{n},$$

i.e., the scenario in which the server is resource poor described above. Hence, the streaming rate is consistent with Equation (1) and the maximum streaming rate is reached.

Case 2:

$$u_s/\delta \leq \frac{\sum_{i=1}^{n} u_i}{(n-1)\delta}$$

In this scenario, the server has the upload capacity to service the 'pull' signals at the maximum rate. During the time period when the 'pull' signal queue is empty, the server transmits duplicate NF marked content to all peers. The amount of upload capacity used to service F marked content is $$\frac{\sum_{i=1}^{n} u_i}{(n-1)\delta}\delta = \frac{\sum_{i=1}^{n} u_i}{(n-1)}.$$

The server's upload bandwidth used to service NF marked content is, therefore $$u_s - \frac{\sum_{i=1}^{n} u_i}{(n-1)}.$$

For each individual peer, the rate of receiving NF marked content from the server is $$\left(u_s - \frac{\sum_{i=1}^{n} u_i}{(n-1)}\right)\bigg/n.$$

Since there are n peers in the system, the supportable streaming rate for the peers is:

$$\frac{\sum_{i=1}^{n} u_i}{(n-1)} + \left(u_s - \frac{\sum_{i=1}^{n} u_i}{(n-1)}\right)\bigg/n = \frac{u_s + \sum_{i=1}^{n} u_i}{n}.$$

The condition $$u_s \leq \frac{u_s + \sum_{i=1}^{n} u_i}{n},$$

is equivalent to $$u_s/\delta > \frac{\sum_{i=1}^{n} u_i}{(n-1)\delta}$$

i.e. the scenario in which the server is resource rich described above. Again, the streaming rate reaches the upper bound as indicated in Equation (1).

Note that in case 2 where the aggregate 'pull' signal arrival rate is smaller than the server's service rate, it is assumed that the peers receive F marked content immediately after issuing the 'pull' signal. The above assumption is true only if the 'pull' signal does not encounter any queuing delay and can be serviced immediately by the content source server. This means that (i) no two 'pull' signals arrive at the exact same time and (ii) a 'pull' signal can be serviced before the arrival of next incoming 'pull' signal. Assumption (i) is commonly used in queuing theory and is reasonable since a P2P system is a distributed system with respect to peers generating 'pull' signals. The probability that two 'pull' signals arrive at exactly the same time is low. Assumption (ii) means that the data can be transmitted in arbitrary small amounts, i.e., the size of data chunk, $\delta$, can be arbitrarily small. In practice, the size of data chunks is limited in order to reduce the overhead associated with data transfers.

Implementation considerations in realizing the above scheme in practice are now discussed. The architecture of content source server and peers using the queue-based data chunk scheduling method of the present invention are now described with an eye toward practical implementation considerations including the impact of chunk size, network congestion and peer churn.

In the optimality proof, it was assumed that the chunk size could be arbitrarily small and the propagation delay was negligible. In practice, the chunk size is on the order of kilo-bytes to avoid excessive transmission overhead caused by protocol headers. The propagation delay is on the order of tens to hundreds of milliseconds. Hence, it is necessary to adjust the timing of issuing 'pull' signals by the peers and increase the number of F marked chunks served at the content source server to allow the queue-based scheduling method of the present invention to achieve close to the maximum live streaming rate.

At the server side, K F marked chunks are transmitted as a batch in response to a 'pull' signal from a requesting peer (via the F marked content queue). A larger value of K would reduce the 'pull' signal frequency and thus reduce the signaling overhead. This, however, increases peers' startup delay. When the 'pull' signal queue is empty, the server's forwarding queue forwards one chunk at a time to all peers in the system. The arrival of a new 'pull' signal preempts the forwarding queue activity and the F marked content queue services K chunks immediately.

Figure 4:
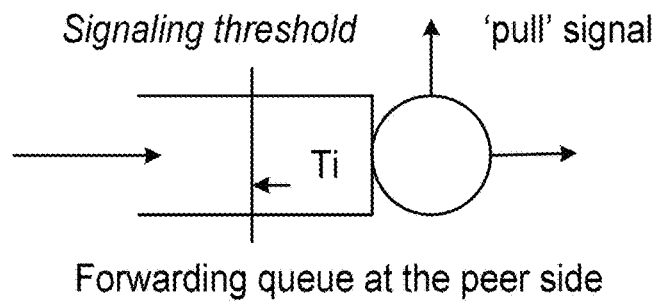
FIG. 4 shows the signal threshold of the peer forwarding queue model in accordance with the principles of the present invention.

Referring now to FIG. 4, on the peer side, the peer sets a threshold of $T_i$ for the forwarding queue. The 'pull' signal is issued when the number of chunks of content in the queue is less than or equal to $T_i$. It takes at least twice the propagation delay to retrieve the F marked content from the server. Issuing the 'pull' signals before forwarding queues become entirely empty avoids wasting the upload capacities.

How to set the value of $T_i$ properly is considered next. The time to empty the forwarding queue with $T_i$ chunks is $t_i^{empty}=(n-1)T_i\delta/u_i$. Meanwhile, it takes $t_i^{receive}=2t_{si}+K\delta/u_s+t_q$ for peer i to receive K chunks after it issues a 'pull' signal. Here $t_{si}$ is the propagation delay between the content source server and peer i, $K\delta/u_s$ is the time required for server to transmit K chunks, and $t_q$ is queuing delay seen by the 'pull' signal at the server 'pull' signal queue. In order to receive the chunks before the forwarding queue becomes fully drained, $t_i^{empty} \geq t_i^{receive}$. This leads to $$T_i \geq (2t_{si}+K\delta/u_s+t_q)u_i/(n-1)\delta \qquad (2)$$

All quantities are known except $t_q$, the queuing delay incurred at the server side 'pull' signal queue. In case 1, where the content source server is the bottleneck (the content source server is resource poor), the selection of $T_i$ will not affect the streaming rate as long as the server is always busy. In case 2, since the service rate of signal queue is faster than the 'pull' signal rate, $t_q$ is very small. So $t_q$ can be set to zero, i.e., $$T_i \geq (2t_{si}+K\delta/u_s)u_i/(n-1)\delta \qquad (3)$$

The peers' startup delay is computed next. $\tau$ denotes the startup delay. Given a peer has a full queue with $T_i$ number of marked chunks, it takes $$T_i\delta(n-1)/u_i=2t_{si}+K\delta/u_s \qquad (4)$$

to send chunks to all other peers. Notice that the time required to clean up the queue is the same for all peers. During this time period, a peer is able to receive the cached chunks from other peers. Hence the startup delay is $\tau=2t_{si}+K\delta/u_s$.

The content source server responds to the 'pull' signals from peers and pushes NF marked content proactively to peers. The content source server is also the bootstrap node. As the bootstrap node, the content source server also manages peer information (such as peer id, IP address, port number, etc.) and replies to the request for peer list from incoming new peers.

Figure 5:
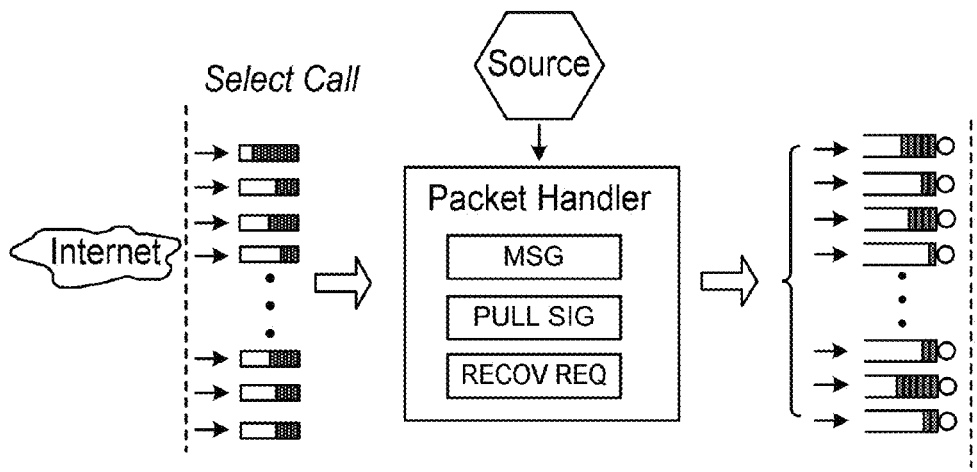
FIG. 5 illustrates the architecture of a content source server in accordance with the principles of the present invention.

FIG. 5 illustrates the architecture of a content source server. In the queue-based adaptive P2P live streaming, the server and all peers are fully connected with full-duplex transmission control protocol (TCP) connections. Using the 'select call' mechanism (or any equivalent means by which content is or can be monitored) to monitor the connections with peers, the server maintains a set of input buffers to store received data. There are three types of incoming messages at the server side: management message, 'pull' signal, and missing chunk recovery request. Correspondingly three independent queues are formed for the messages respectively. If the output of handling these messages needs to be transmitted to remote peers, the output is put on the per-peer out-unit to be sent.

Figure 6:
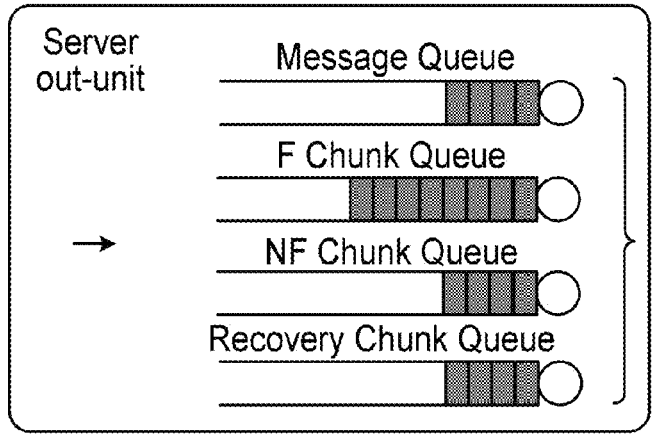
FIG. 6 depicts an exemplary out-unit that has four queues in accordance with the principles of the present invention.

There is one out-unit for each destination peer to handle the data transmission process. FIG. 6 depicts an exemplary out-unit that has four queues for a given/particular peer: management message queue, F marked content queue, NF marked content queue, and missing chunk recovery queue. The management message queue stores responses to management requests. An example of a management request is when a new peer has just joined the P2P system and requests the peer list. The server would respond by returning the peer list. The F/NF marked content queue stores the F/NF marked content intended for this peer. Finally, chunk recovery queue stores the missing chunks requested by the peer.

Different queues are used for different types of traffic in order to prioritize the traffic types. Specifically, management messages have the highest priority, followed by F marked content and NF marked content. The priority of recovery chunks can be adjusted based on design requirements. Management messages have the highest priority because it is important for the system to run smoothly. For instance, by giving management messages the highest priority the delay for a new peer to join the system is shortened. When a new peer issues a request to the content source server to join the P2P system, the peer list can be sent to the new/joining peer quickly. Also, management messages are typically small in size compared to content messages. Giving higher priority to management message reduces overall average delay. The content source server replies to each 'pull' signal with K F marked chunks. F marked chunks are further relayed to other peers by the receiving peer. The content source server sends out a NF marked chunk to all peers when the 'pull' signal queue is empty. NF marked chunks are used by the destination peer only and will not be relayed further. Therefore, serving F marked chunk promptly improves the utilization of peers' upload capacity and increases the overall P2P system live streaming rate. Locating and serving recovery chunks should be a higher priority than NF marked chunk delivery since missing chunks affect the viewing quality significantly. If the priority of forwarding recovery chunks is set to be higher than that of F marked chunks, viewing quality gets preferential treatment over system efficiency. In contrast, if F marked chunks receive higher priority, the system efficiency is given higher priority. The priority scheme selected depends on the system design goal.

Another reason for using separate queues is to deal with bandwidth fluctuation and congestion within the network. Many P2P researchers assume that server/peer's upload capacity is the bottleneck. In recent experiments over PlanetNet, it has been observed that some peers may slow down significantly due to congestion. If all the peers share the same queue, the uploading to the slowest peer will block the uploading to remaining peers. The server's upload bandwidth will be wasted. This is similar to the head-of-line blocking problem in input-queued switch design: an input queue will be blocked by a packet destined for a congested output port. The switching problem was solved by placing packets destined to different output ports in different virtual output queues. Here a similar solution is adopted by using separate queues for different peers. Separate queues avoid inefficient blocking caused by slow peers. Separate queues allow more accurate estimation of the amount of queued content, too. This is important for peers to determine when to issue 'pull' signals.

Figure 7:
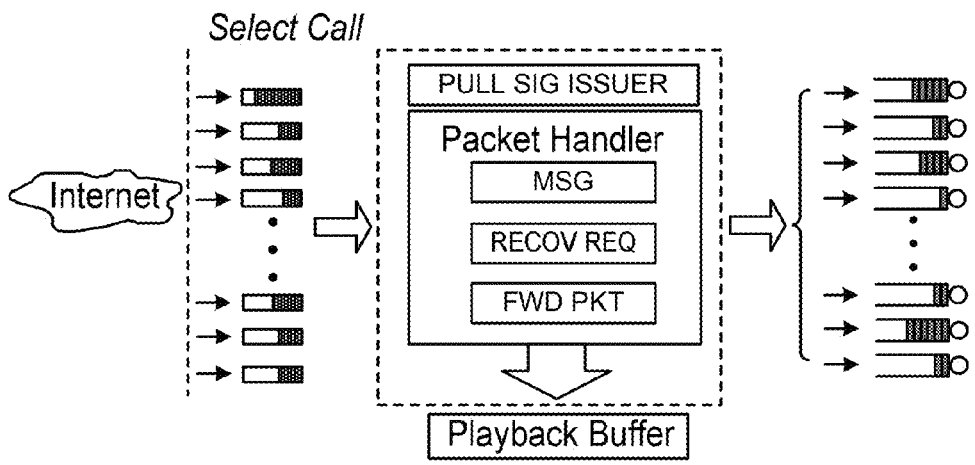
FIG. 7 depicts the architecture of a peer in accordance with the principles of the present invention.

Referring now to FIG. 7, which depicts the architecture of a peer. The architecture of a peer in the P2P system described herein is similar to that of the content source server. The server and all peers are fully connected with full duplex TCP connections. A peer stores the received chunks into the playback buffer. The management messages from server (e.g., the peer list) or other peers (missing chunk recovery message) are stored in management message queue. The chunk process module filters out NF marked chunks. F marked chunks are duplicated into the out-units of all other peers.

Figure 8:
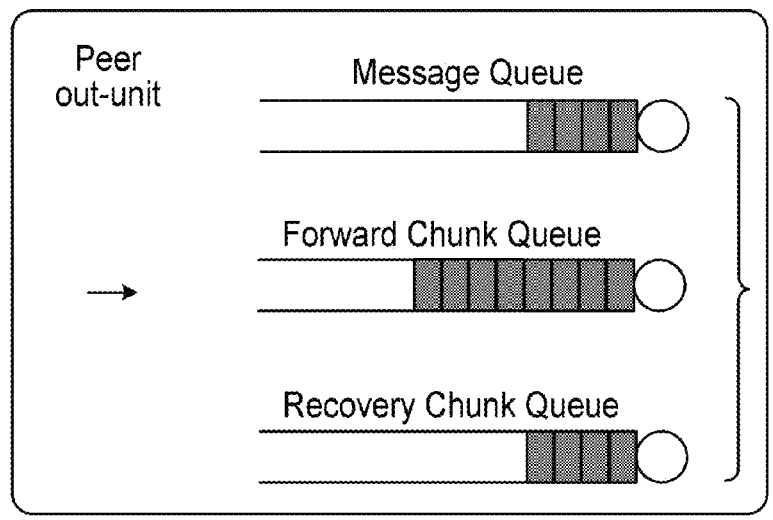
FIG. 8 depicts the structure of peer side out-unit in accordance with the principles of the present invention.

FIG. 8 depicts the structure of peer side out-unit. It has three queues: management message queue, forward queue, and recovery chunk queue. Chunks in the forward queue will be marked as NF and will not be relayed further at receiving peers. 'Pull' signal issuer monitors the out-units and determines the queue threshold as described in Equation (2) to decide when to issue 'pull' signals to the content source server. When calculating the 'pull' signal threshold according to Equation (2), the underlying assumption is that remote peers are served in a round-robin fashion using a single queue. In practice, due to the bandwidth fluctuation and congestion within the network, any slowdown to one destination peer influences the entire process. Hence, a one-queue-per-peer design is used. The average of the forward queue size is used in Equation (2). If a peer always experiences a slow connection, some chunks may be forced to be dropped. Peers have to use missing chunk recovery mechanism to recover from the loss.

Peer churn and network congestion may cause chunk losses. Sudden peer departure, such as node or connection failure, leaves the system no time to reschedule the chunks still buffered in the peer's out-unit. In case the network routes are congested to some destinations, the chunks waiting to be transmitted may overflow the queue in the out-unit, which leads to chunk losses at the receiving end. The missing chunk recovery scheme of the present invention enables the peers to recover the missing chunks to avoid viewing quality degradation.

Figure 9:
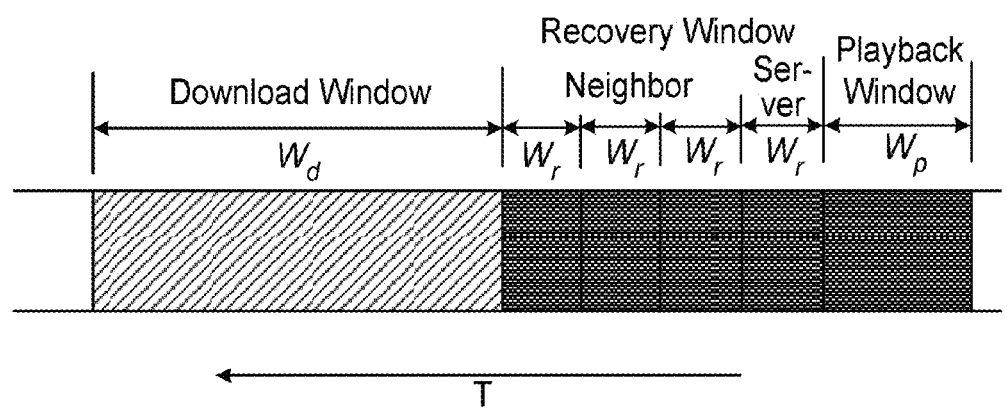
FIG. 9 shows the playback buffer in a peer in accordance with the principles of the present invention.

Referring to FIG. 9, which shows a playback buffer. Each peer maintains a playback buffer to store the video chunks received from the server and other peers. The playback buffer maintains three windows: playback window, recovery window, and download window. $W_p$, $W_r$ and $W_d$ denote the size (in terms of number of chunks) of playback window, recovery window, and download window, respectively. The media player renders/displays the content from the playback window. Missing chunks in the recovery window are recovered using the method described below. Finally, the chunks in the downloading window are pulled and pushed among the server and the other peers. The size of download window, $W_d$, can be estimated as follows:

$$W_d = \sum_{i=1}^{n} T_i + \left(u_s - \frac{\sum_{i=1}^{n} u_i}{n-1}\right)\tau/\delta$$

$$= \frac{\tau}{\delta}\left(\frac{u_s + \sum_{i=1}^{n} u_i}{n}\right)$$

$$= \frac{\tau}{\delta}R$$

where R is the streaming rate of the system as indicated in Equation (1), and τ is the startup delay. The first term in the above equation is the sum of all F marked chunks cached at all peers. The second term is the number of NF marked chunks sent out by the server. The download window size is a function of startup delay. Intuitively, it takes the startup delay time to receive all chunks in the download window. The chunks in the download window arrive out of order since the chunks are sent out in parallel from out-units in each peer. This accounts for the startup delay time being at least of τ. In practice, the startup delay has to be increased to accommodate the time period introduced by playback window and recovery windows.

Heuristics are employed to recover the missing chunks. If peers leave gracefully, the server is notified and the F marked chunks waiting in the out-unit will be assigned to other peers. The missing chunks falling into the recovery window are recovered as follows. First, the recovery window is further divided into four sub-windows. Peers send the chunk recovery messages to the source server directly if the missing chunks are in the window closest in time to the playback window because these chunks are urgently needed or the content quality will be impacted if these chunks are not received in time. An attempt is made to recover the missing chunks in the other three sub-windows from other peers. A peer randomly selects three recovery peers from the peer list, and associates one with each sub-window. The peer need recovery chunks sends chunk recovery messages to the corresponding recovery peers. By randomly selecting a recovery peer, the recovery workload is evenly distributed among all peers.

Figure 10:
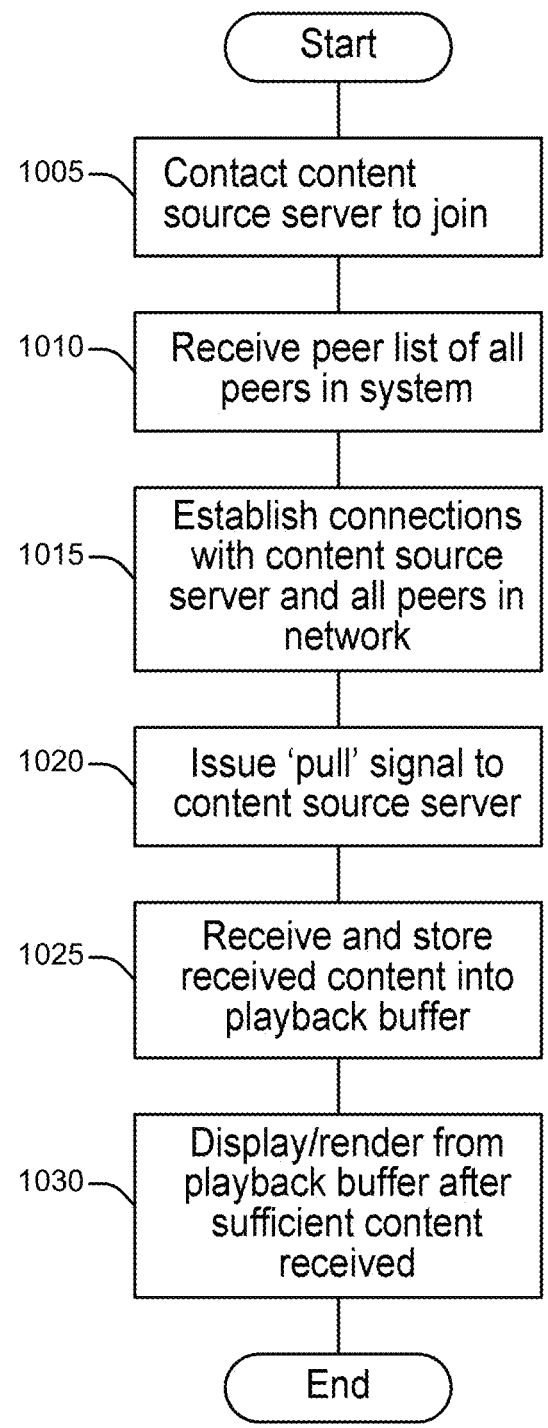
FIG. 10 is a flowchart of an exemplary method for a peer joining a P2P network in accordance with the principles of the present invention.

FIG. 10 is a flowchart of an exemplary method for a peer joining a P2P network. At 1005, the new/joining peer contacts the content source server and requests permission to join the P2P system/network. Upon receipt of the joining peer's request and the content source server's acceptance of the joining peer, the content source server sends the joining peer the peer list, which is a list of all the peers in the network. The peer list also includes any other information that the joining peer needs in order to establish connections with the other peers in the network. At 1010 the joining peer receives the peer list from the content source server. The joining peer establishes connections with all of the other peers/nodes in the network/system at 1015. Once the connections are established, the joining peer issues a 'pull' signal to the content source server at 1020 in order to start receiving content. The joining peer receives content and stores the received content in its playback buffer at 1025. At 1030, the new peer stats to render/display the received content from the playback buffer after sufficient content has been received.

Figure 11A:
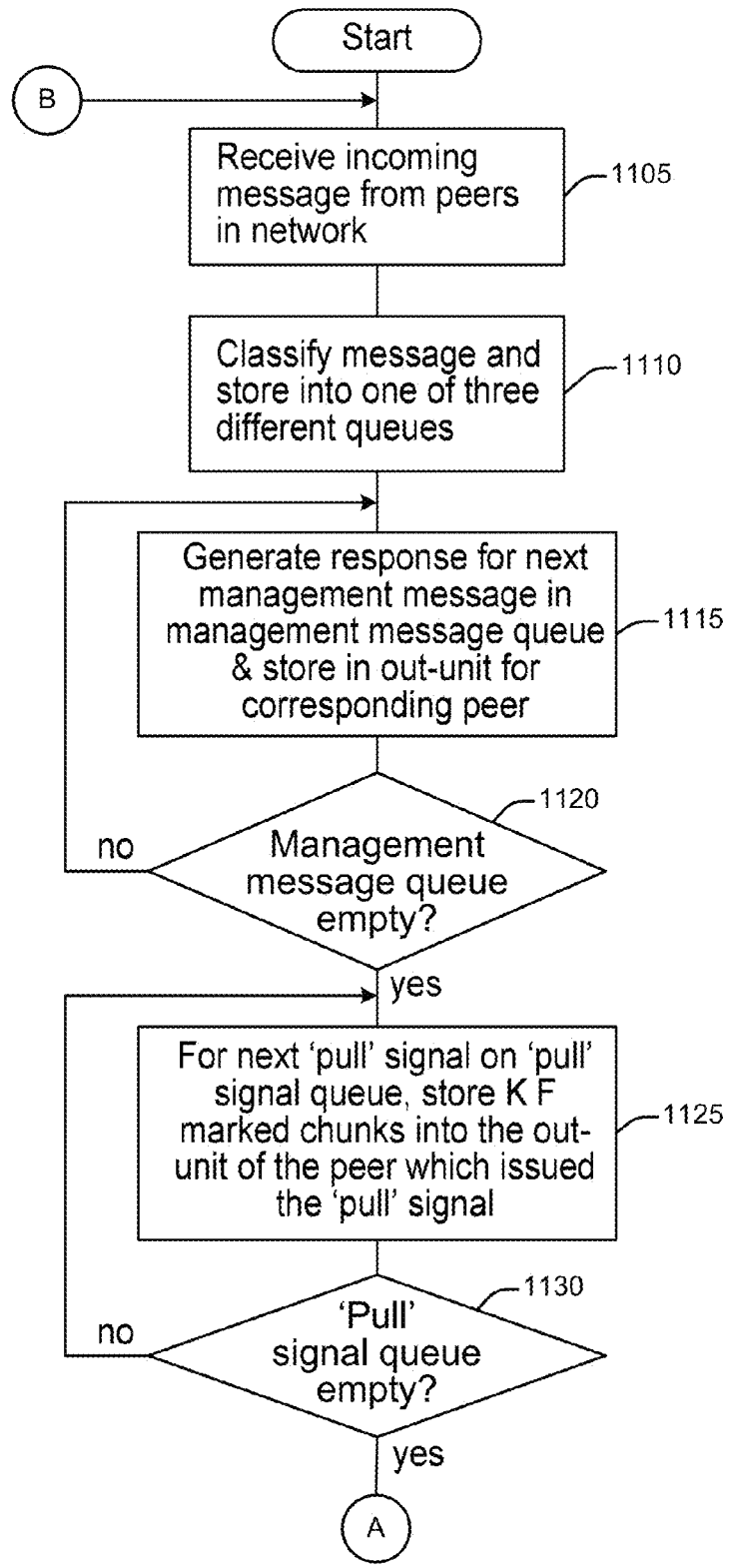
FIGS. 11A and 11B together are a flowchart of the queue-based scheduling method of the present invention from the perspective of the content source server.
Figure 11B:
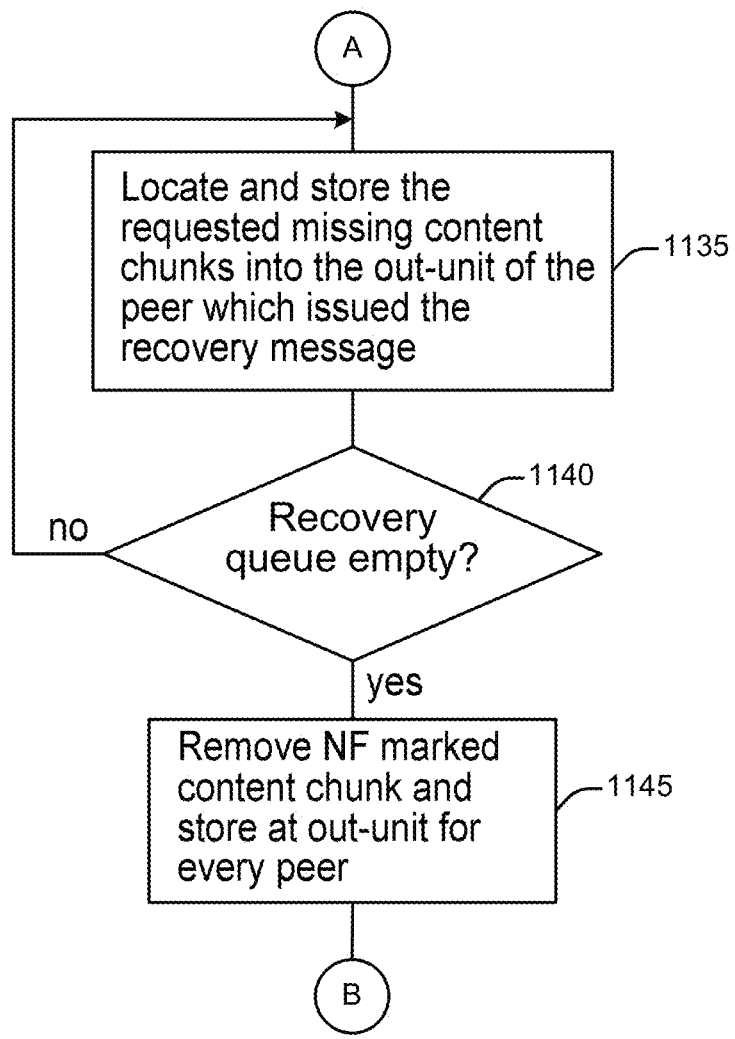

FIGS. 11A and 11B together are a flowchart of the queue-based scheduling method of the present invention from the perspective of the content source server. At 1105 the content source server receives an incoming message from peers in the P2P network/system. The content source server then classifies the received message and stores it into one of three queues at 1110. The three queues are the MSG queue, the RECOV REQ queue and the Pull signal queue. The MSG queue is for management messages. The RECOV REQ queue is for missing content chunk recovery requests. The PULL SIG queue is for 'pull' signals. At 1115 a response is generated for the next management message in the MSG queue and the generated response is stored in the out-unit for the corresponding peer (the peer who issued the management message request). A test is performed at 1120 to determine if the MSG queue is empty. If the MSG queue is not empty then 1115 is repeated. If the MSG queue is empty then the content source server proceeds to 1125 and removes the next message from the PULL SIGN queue and responds by locating and storing K F marked content chunks into the out-unit of the peer which issued the 'pull' signal. A test is performed at 1130 to determine if the PULL SIGN queue is empty. If the PULL SIG queue is not empty then 1125 is repeated. If the PULL SIG queue is empty then the content source server proceeds to 1135 and removes the next message from the RECOV REQ queue and responds by locating and storing the requested missing content chunks into the out-unit of the peer which issued the missing content chunk recovery message. A test is performed at 1140 to determine if the RECOV REQ queue is empty. If the RECOV REQ queue is not empty then 1135 is repeated. If the RECOV RE queue is empty then the content source server removes NF marked content chunk and sores the NF marked content chunk at the out-unit for every peer at 1145. The queue-based scheduling method of the present invention (for the content source server) then proceeds to re-execute the entire method. This continues until the P2P network no longer exists.

Figure 12A:
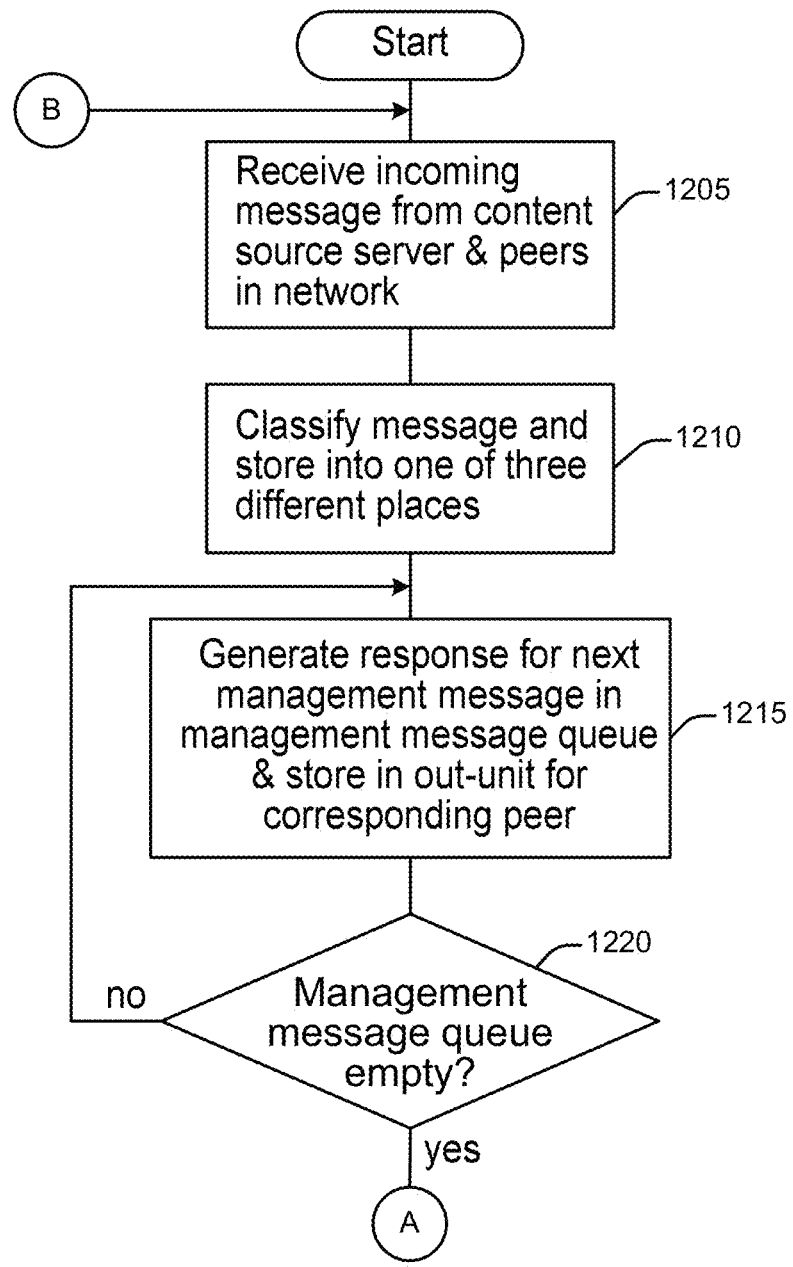
FIGS. 12A and 12B together are a flowchart of the queue-based scheduling method of the present invention from the perspective of the peers/nodes.
Figure 12B:
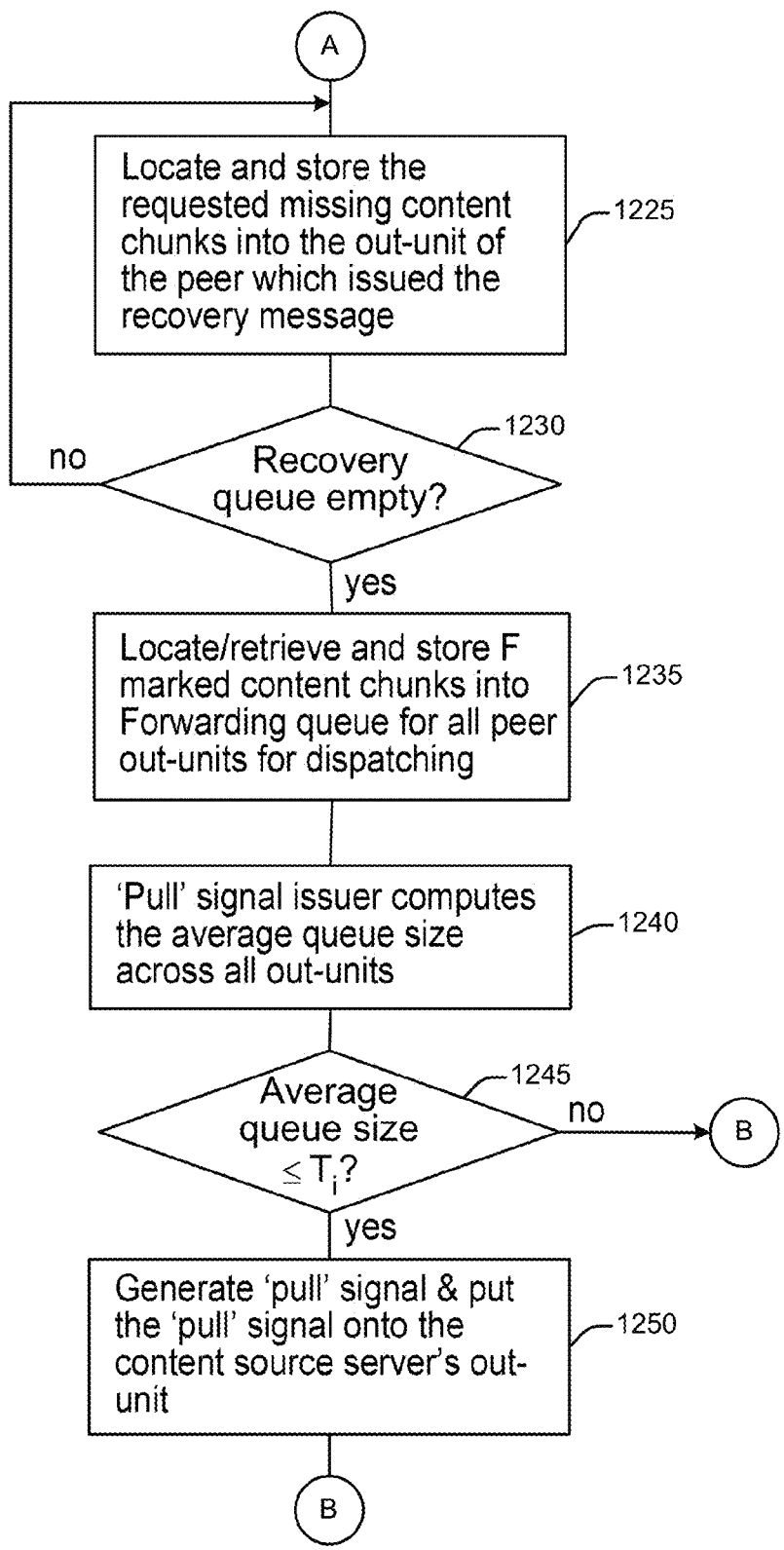

FIGS. 12A and 12B together are a flowchart of the queue-based scheduling method of the present invention from the perspective of the peers/nodes. At 1205 the peer receives an incoming message from the server or other peers in the P2P network/system. The peer then classifies the received message and stores it into one of three places at 1210. The three places are the MSG queue, the RECOV REQ queue and the Forwarding queue. The MSG queue is for management messages. The RECOV REQ queue is for missing content chunk recovery requests. The Forwarding queue is content that the peer/node received as a result of a 'pull' signal that the peer issued and should be forwarded to other peers in the network. Any received content is also placed in the playback buffer at the appropriate place. At 1215 a response is generated for the next management message in the MSG queue and the generated response is stored in the out-unit for the corresponding peer (the peer who issued the management message request). A test is performed at 1220 to determine if the MSG queue is empty. If the MSG queue is not empty then 1215 is repeated. If the MSG queue is empty then the peer proceeds to 1225 and locates and stores the requested missing content chunk(s) into the out-unit of the peer which issued the recovery request message. A test is performed at 1230 to determine if the RECOV REQ queue is empty. If the RECOV REQ queue is not empty then 1225 is repeated. If the RECOV REQ queue is empty then the peer proceeds to 1235 and locates/retrieves and stores F marked content chunks into the Forwarding queue for all peer out-units for dispatching. At 1240 the 'pull' signal issuer computes/calculates the average queue size across all out-units maintained by the peer. A test is performed at 1245 to determine if the average queue size is less than or equal to threshold $T_i$. If the average queue size is less than or equal to $T_i$, then a new 'pull' signal is generated and put onto the content source server's out-unit at 1250. If the average queue size is greater than threshold $T_i$, then the queue-based scheduling method of the present invention (for the peer) then proceeds to re-execute the entire method. This continues until the P2P network no longer exists or until the peer exits/leaves the network voluntarily or through failure of the peer or one or more connections.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:
1. A method for a content server for scheduling live streaming in a peer-to-peer network comprising:
    removing by a processor a message from a first message queue for storing messages from peers requesting forwarding-content;

transmitting by a processor forwarding-content to a peer from whom said message is sent; and when said first message queue is empty, transmitting by a processor non-forwarding-content to all peers in said peer-to-peer network, wherein said forwarding-content is content to be forwarded by said peer to other peers as non-forwarding content, and non-forwarding-content is content not to be forwarded by said peer to other peers.

2. The method according to claim 1, further comprising:
receiving by a processor a joining request from a joining peer, wherein said joining request is a request to join said peer-to-peer network; and
storing by a processor said joining request in a second message queue.

3. The method according to claim 2, wherein said second message queue has a higher priority than said first message queue.

4. The method according to claim 2, further comprising
responding by a processor to said joining request by transmitting to said joining peer a peer list and contact information for peers already in said peer-to-peer network.

5. The method according to claim 1, further comprising:
receiving by a processor a request to recover missing content from a peer; and
storing by a processor said joining request in a third message queue.

6. The method according to claim 5, further comprising
responding by a processor to said request to recover missing content by transmitting said requested missing content to said peer.

7. The method according to claim 1, wherein said peer sends said message when a threshold set by said peer is reached.

8. An apparatus for a content server for scheduling live streaming in a peer-to-peer network comprising:
memory including:
a first message queue storing messages from peers requesting forwarding-content from said apparatus, and
a content queue storing content to be transmitted to peers in said peer-to-peer network, said content queue including forwarding-content and non-forwarding-content; and
a processor configured to transmit said content based on the status of said first message queue, and further wherein
when said first message queue is non-empty, said processor transmits forwarding-content to a peer in response to a message sent by said peer in said first message queue, and
when said first message queue is empty, said processor transmits non-forwarding-content to all peers in said peer-to-peer network, wherein said forwarding-content is content to be forwarded by said peer to other peers as non-forwarding content, and non-forwarding-content is content not to be forwarded by said peer to other peers.

9. The apparatus according to claim 8, wherein said memory further includes a second message queue and said processor is configured to store joining requests from joining peers in said second message queue, wherein said joining request is a request sent by a peer to join said peer-to-peer network.

10. The apparatus according to claim 9, wherein said second message queue has a higher priority than said first message queue.

11. The apparatus according to claim 9, wherein said memory further includes a management message queue for a peer and said processor is configured to store in said management message queue responses to joining requests in said second message queue sent by said peer.

12. The apparatus according to claim 8, wherein said memory further includes a third message queue and said processor is configured to store in said third message queue requests from peers to recover missing content.

13. The apparatus according to claim 12, wherein said memory further includes a recovery queue and said processor is configured to store in said recovery queue missing content requested by a peer in response to a request in said third message queue sent by said peer.

14. The apparatus according to claim 8, wherein said peer sends said message when a threshold set by said peer is reached.

15. A method for a peer for scheduling live streaming in a peer-to-peer network comprising:
sending by a processor a message requesting for forwarding-content to a content server;
receiving by a processor requested forwarding-content from said content server; and
transmitting as non-forwarding content by a processor said received forwarding-content to other peers in said peer-to-peer network, wherein said forwarding-content is content to be forwarded by said peer to other peers and non-forwarding-content is content not to be forwarded by said peer to other peers.

16. The method according to claim 15, wherein said transmitting step comprises storing said received forwarding-content into at least one content forwarding queue; and
transmitting content in said at least one content forwarding queue to other peers in said peer-to-peer network.

17. The method according to claim 16, wherein said message requesting for forwarding-content is sent to said content server when a size of said at least one content forwarding queue is below a given threshold.

18. The method according to claim 17, wherein there is one content forwarding queue for each of other peers and said size of said at least one content forwarding queue is determined as an average queue size of said at least one content forwarding queue.

19. The method according to claim 17, wherein said message requesting for forwarding-content is sent to said content server when said at least one content forwarding queue is empty.

20. The method according to claim 15, further comprising receiving by a processor non-forwarding-content from at least one of said content server and other peers in said peer-to-peer network.

21. The method according to claim 15, wherein said transmitted forwarding-content is received by said other peers as non-forwarding-content.

22. The method according to claim 15, further comprising:
receiving by a processor a request to recover missing content from a requesting peer; and
transmitting by a processor said requested missing content to said requesting peer.

23. An apparatus for a peer for scheduling live streaming in a peer-to-peer network comprising:
memory, including a playback buffer storing received content from at least one of said content server and other peers; and
a processor configured to:

send a message requesting for forwarding-content to a content server in said peer-to-peer network, and filter content in said playback buffer to obtain forwarding-content for transmitting to other peers, wherein said forwarding-content is content to be forwarded by said peer to other peers as non-forwarding-content, and non-forwarding-content is content not to be forwarded by said peer to other peers.

24. The apparatus according to claim 23, wherein said memory further includes at least one forwarding queue and said processor is further configured to store in said at least one forwarding queue forwarding-content to other peers in said peer-to-peer network.

25. The apparatus according to claim 24, wherein said processor is configured to send a message requesting for forwarding-content to said content server when a size of said at least one content forwarding queue is below a given threshold.

26. The apparatus according to claim 25, wherein said at least one forwarding queue comprises one content forwarding queue for each of other peers and said size of said at least one content forwarding queue is determined as an average queue size of said at least one content forwarding queue.

27. The apparatus according to claim 25, wherein said processor is configured to send said message requesting for forwarding-content to said content server when said at least one content forwarding queue is empty.

28. The apparatus according to claim 23, wherein said transmitted forwarding-content is received by said other peers as non-forwarding-content.

29. The apparatus according to claim 23, wherein said memory further includes a recovery message queue and said processor is further configured to store in said recovery message queue requests from peers to recover missing content, and said memory further includes a recovery content queue and said processor is further configured to store in said recovery content queue missing content requested by a peer in response to a request in said recovery message queue sent by said peer.

* * * * *